United States Patent
Shipley

[15] 3,656,283
[45] Apr. 18, 1972

[54] POWER DRIVEN TREE HARVESTING METHOD

[72] Inventor: Robert M. Shipley, Cloverdale, Calif.
[73] Assignee: Kelsey-Hayes Company
[22] Filed: Aug. 27, 1970
[21] Appl. No.: 67,302

Related U.S. Application Data

[62] Division of Ser. No. 759,313, Sept. 12, 1968, Pat. No. 3,548,578.

[52] U.S. Cl. ................................................56/1, 56/DIG. 2
[51] Int. Cl. ........................................................A01g 19/01
[58] Field of Search......................56/1, DIG. 2, 328 TS, 329

[56] References Cited

UNITED STATES PATENTS 3,338,040  8/1967  Shipley, Jr.........................56/328 TS
3,220,268  11/1965  Brandt..........................56/328 TS UX Primary Examiner—Louis G. Mancene
Assistant Examiner—J. N. Eskovitz
Attorney—Warren, Rubin, Brucker & Chickering

[57] ABSTRACT

A tree harvesting method which comprises the applying to the tree trunk and substantially normal thereto a power driven vibratory displacement having a beat of varying frequency and amplitude.

1 Claims, 3 Drawing Figures

PATENTED APR 18 1972

3,656,283

INVENTOR.
ROBERT M. SHIPLEY, JR.

Warren, Rubin,
Brucker and Chickering
ATTORNEYS 3,656,283

POWER DRIVEN TREE HARVESTING METHOD

The invention relates to tree shaking apparatus and functioning for harvesting the fruit and nut products of the tree. This application is a division of application Ser. No. 759,313, filed Sept. 12, 1968, for Tree Shaking Apparatus U.S. Pat. No. 3,548,578.

Tree Shaking Apparatus is commonly composed of a clamp which is fastened to the trunk or limb of the tree to be shaken and power driven means connected to the clamp for developing a vibratory action. One of the more common forms of the drive consists of a pair of eccentrically weighted rotors which are driven by a hydraulic motor which is in turn driven from the gasoline engine of the tractor or other piece of equipment with which the shaker is associated. In such arrangements a regular periodic vibration is applied to the tree having a frequency which is a function of the speed of the gasoline engine drive. When an essentially fixed frequency vibration is applied to the tree, a limited amount of fruit will initially fall and then nothing more will happen. The tree reacts to dampen the applied vibration and a null point rapidly develops in the area of greatest mass in the tree where most of the fruit is located. By changing the applied frequency, another batch of fruit may be removed. The most effective field practice therefor is to use the engine throttle to progressively increase the engine speed to a maximum and then progressively reduce the engine speed in order to produce varying vibratory frequencies. This "reving" up and down of the engine drive may be required many times for the efficient removal of fruit from all portions of the tree.

In accordance with the present invention the vibratory displacement applied to the tree is distinguishable from the prior art in having for any given speed of engine operation a beat of varying frequency and amplitude. A characteristic beat is composed of a series of relatively high frequency low amplitude vibrations accompanied by regular periodic bursts of relatively low frequency high amplitude vibration, the two combining to produce what is now referred to in the field as a syncopated or rumba beat which is vastly superior to anything heretofore evolved in the efficient harvesting of fruit an nuts. Due to the wide spectrum of frequency application to the tree as well as regular reoccurring low and high amplitudes of displacement, a minimum "reving" action of the engine is required. Normally, a single "reving" up and down of the engine will effect a very efficient and rapid removal of the fruit and nuts.

Accordingly, it is an object of this invention to provide a tree shaking action in which the vibrational shaking action is harmonic in character, i.e. it undergoes cycles of variation in vibrational energy with certain short time increments providing especially high energy concentrations.

Another object of the invention is to provide a tree shaking action of the character described in which concentrated shaking action is provided in a randomly variable direction whereby complete shaking of the tree may be achieved rapidly and efficiently.

The invention possesses other objects and features of advantage, some of which of the foregoing will be set forth in the following description of the preferred form of the invention which is illustrated in the drawing accompanying and forming part of this specification. It is to be understood, however, that variations in the showing made by the said drawing and description may be adopted within the scope of the invention as set forth in the claims.

Referring to said drawing.

Figure 1:
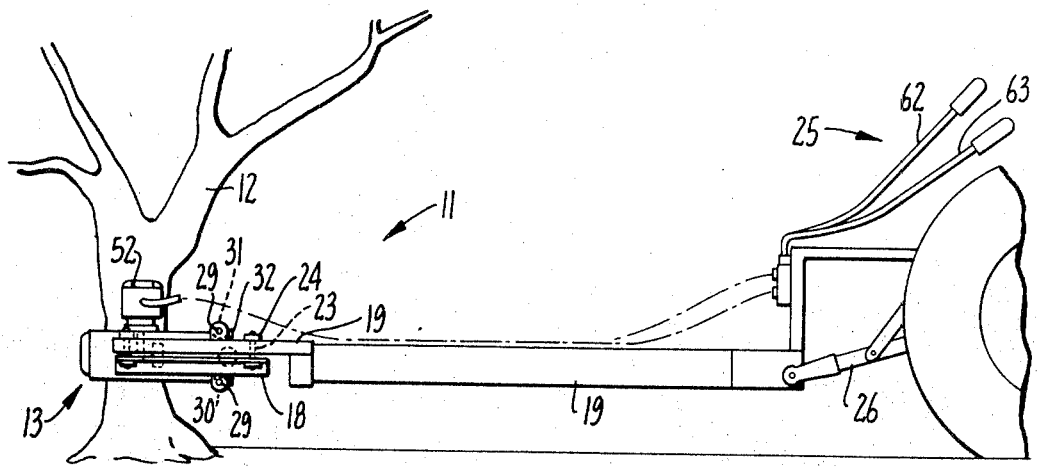
FIG. 1 is a side elevational view of a tree shaking apparatus which may be used to produce the method of the present invention.

Referring to the drawing in greater detail, there is shown tree shaking apparatus 11 adapted to be clamped to a tree 12 to be shaken and comprising a vibrating unit 13, containing a pair of eccentrically weighted rotors 14 and 16, together with means for imparting rotary motion to each of the rotors and a clamping means 17 for holding the vibrating unit 13 in place on the tree 12.

Figure 2:
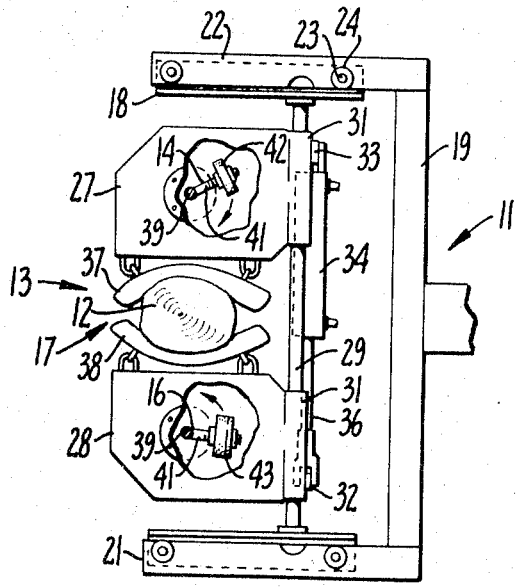
FIG. 2 is a plan view on an enlarged scale of a portion of the apparatus of FIG. 1 with parts broken away for clarity of illustration.

During shaking, the vibrating unit 13 is freely mounted on the tree 12 in such a way that it is not unduly impeded in its vibratory motion by an external structure. For this purpose, the vibrating unit 13 here includes a support member 18 in the form of a frame which is held in swinging fashion by a main support 19. As best seen in FIGS. 1 and 2, the main support 19 is fork shaped and has a pair of parallel members 21 and 22 adapted to fit horizontally on each side of the tree to be shaken. The support member 18 is swingably supported from members 21 and 22 by four connecting rods 23 held in shock absorbers 24.

The main support 19 may be attached to any suitable vehicle, and a preferred attachment is that shown in FIG. 1 where the support is attached to a tractor 25 through suitable linkages 26 adapted to provide elevation to main support 19 and yet retain it in the substantially horizontal position. These linkages are constructed to be raised and lowered by standard lifts utilized for handling other tools which are constructed for use with a tractor.

The vibrating unit 13 includes two vibrating elements 27 and 28, which are slidably mounted on rods 29 by two pairs of sleeves 30 and 31. Each pair of sleeves 30 and 31 are held as a single unit by cross bars 32 and 33 and the vibrating elements are urged relatively toward one another by forces applied to these cross bars. These forces are obtained by operation of a hydraulic cylinder 34 and its associated connecting rod 36.

In this way, the hydraulic cylinder and associated equipment serves as the mobile part of the clamping means 17, the clamping jaws being in the form of flexible pads 37 and 38 positioned in face to face relationship on each of the vibrating elements 27. Preferably, these flexible pads are composed of a rubber-like substance and are contoured to spread their forces more evenly over the irregular shape of a trunk of a tree.

As described so far, the structure of the embodiment of FIGS. 1 and 2 is similar to the corresponding structure shown in my U.S. Pat. No. 3,338,040, with the exception of vibrating elements 27 and 28. Accordingly, a more detailed description of certain of the common elements may be found in said patent which is incorporated herein by reference for that purpose.

The unique varying pattern and intensity of vibrating forces provided by the present invention result from driving the eccentrically weighted rotors 14 and 16 in a novel manner and forming them so they have different moments of inertia. As shown in FIGS. 1 and 2, each of the rotors 14 and 16 has a vertical shaft 39, journalled in elements 27 and 28 respectively, and a horizontal shaft 41 extending perpendicularly from the vertical shaft so as to rotate in a horizontal plane. Each of the shafts 41 is threaded to carry a weight spaced from the axes of shafts 39 and secured between a pair of lock nuts. The different moments of inertia are provided in this form of the invention by making the weights of different mass. Thus, as here shown the weight 42 of rotor 14 is smaller than the weight 43 of rotor 16. By smaller, it is meant that weight 42 is lighter, the size reference being based on weight or mass. Each of the weights 42 and 43 are positioned so as to provide substantially the same length of radial arm through the shaft 41. Accordingly, the different weights provide different moments of inertia for the rotors and a corresponding difference in "wobble" effect.

By using easily detachable weights, it is possible to utilize different weight pairs for different sizes or varieties of trees. For example, in a typical tree the weight 42 will weigh 21 pounds and the weight 43 will weight 27 pounds. However, where it is desired to shake a heavier tree weights of 27 and 33 pounds may be used respectively. An increased harmonic shock is obtained when the differential is increased; for example, weights of 24 and 33 pounds respectively will cause a greater effect than weights of 27 and 33 pounds. On the other hand, a weight pair of 14 and 18 pounds could be used for situations where reduced harmonic shock is desired. All of these different weight pairs have been tried and found to be satisfactory in operation.

In order to prevent dirt and debris from interferring with the operation of the rotors and for the sake of safety, it is preferred to provide a housing for each rotor with the housing having an access door or removable panel so that the weights may be changed or adjusted as desired.

In order to produce the novel action of the invention, it is important that the two motors draw from the same power source so that the total power used is the sum of that used by the two motors, but with a parallel or differential draw so that one motor can draw more than the other. In general, this power supply could be hydraulic, pneumatic, electrical or even mechanical. For example if the system were electrical, a common generator could be driven to provide two separate motors wired in parallel from the generator, if pneumatic, the motors would receive compressed air from a single source, and, if mechanical, the shafts would be driven from a single source of mechanical power through a suitable differential gear or the like. However, it is preferred to utilize hydraulic motors in a hydraulic system because of simplicity, and the hydraulic motors are capable of delivering a large amount of power from relatively small motors. In addition, these motors are found to be durable and capable of withstanding without injury the vibrations present in the vibrating unit on which they are carried.

Figure 3:
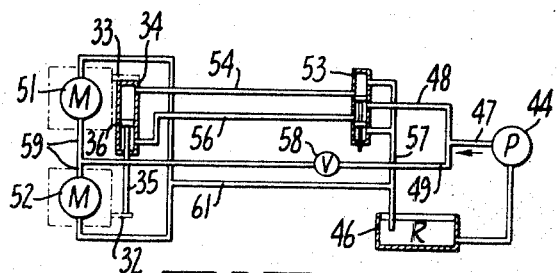
FIG. 3 is a diagrammatic view of a hydraulic power supply system for the apparatus.

A typical hydraulic system that may be used in this invention is shown in FIG. 3 and it will be illustrative of the mode of operation of suitable power systems in general. As shown therein, the hydraulic system includes a pump 44 which takes hydraulic fluid from a reservoir 46 and supplies it under pressure in line 47. The pump 44 is attached to the power takeoff (not shown) of the tractor 25 and thereby converts tractor engine power to hydraulic power for use in the tree shaking apparatus. In this connection, it will be noted that the stored momentum of the tractor engine flywheel tends to keep the pump going and that surge demands of power may be met in this way.

Line 47 is divided into a supply line 48, leading to the clamping cylinder 34, and a supply line 49 for motors 51 and 52, which drive the shafts 39 of rotors 14 and 16 respectively. Fluid from supply line 48 goes through a two-way valve 53 to the appropriate side of cylinder 34 through one of lines 54 or 56, depending upon the valve position, and returns through the other line to fluid return line 57. Hydraulic fluid in line 49 similarly passes through a shut-off valve 58 and through branching supply lines 59 to the inlets both of motors 51 and 52, then back through return line 61 to the reservoir 46.

In order to operate the hydraulic valves 53 and 58, levers 62 and 63 are provided in a convenient position so that the operator may perform the desired shaking from his seat on the tractor.

In the operation of the device shown in FIGS. 1 and 2, the tractor 25 is driven into a position such that the vibrating unit 13 is centrally placed with its vibrating elements 27 and 28 on each side of a tree 12 to be shaken. The lever 62 is then operated to move the hydraulic control valve 53 to the position shown in FIG. 1, retracting the piston in cylinder 34 to being the vibrating elements 27 and 28 relatively towards one another and effect clamping of the flexible pads 37 and 38 against the tree. With the tractor motor revved up to full power and with the vibrating unit in place, lever 63 is operated to open valve 58 and supply hydraulic fluid to drive the motors 51, 52.

After shaking is completed, lever 63 is operated to shut off the motors 51, 52, and lever 62 is operated to move valve 53 to it other position so that supply line 48 is in communication with line 54 and line 56 is connected to exhaust line 57. This causes the cylinder 34 to spread the vibrating units apart and unclamp the unit from the tree.

During the shaking operation, the hydraulic motors operate independently of one another so that the weighted eccentrics may change their relative orbital positions as a result of different speeds of rotation. This change of relative position occurs as the weights seek the lowest level of transferrence of vibrational energy in accordance with usual mechanical principles. However, due to the mismatch of the eccentrics in the present invention, the rotors are forced into a harmonic cycle which causes periods of concentrated shaking as described above. After the concentrated shaking period, the large rotor will slow down and the tractor motor may have itself perceptibly decelerated. Then the large rotor picks up speed until the next concentrated shaking action occurs. When the rotors are on equal radial arms and the weights are, say, 21 and 27 pounds, the harmonic period is about one second. The time of concentrating shaking action is on the order of one-fifth of a second. It will also be noted that this concentrated shaking occurs along a line perpendicular to the tree with the line varying in direction so that subsequent shaking operations utilize a different angle of attack. This change in angle of attack results in complete shaking with only a few harmonic periods having been gone through.

For example, a fully loaded prune tree was shaken by the operation described above. On the first intense harmonic shock, the limbs rose about two feet and a major portion of the fruit was shaken off. On the second shock, nearly all of the remaining fruit was shaken off, and on the third shock the entire tree was stripped together with a few peripheral leaves. Accordingly, the apparatus completely removed the fruit of a fully laden prune tree is about 3 seconds.

The strength of the harmonic beat increases as the rotors are increasingly mismatched up two a mismatch of about two to one.

I claim:

1. A method of shaking a tree for the removal of products therefrom which comprises applying to the tree trunk for rotation in planes substantially normal thereto a plurality of eccentric rotors having different moments of inertia, the moment of inertia of one rotor being greater than the moment of inertia of the other by a ratio of between about 1.2 and about 2, and driving said rotors for individual load responsive speed regulation to provide a vibratory tree displacement characterized by the combination of a relatively high-frequency, low-amplitude vibration and periodic bursts of relatively low-frequency, high-amplitude vibration.

* * * * *

UNITED STATES PATENT OFFICE
CERTIFICATE OF CORRECTION

Patent No. 3,656,283      Dated April 18, 1972

Inventor(s) ROBERT M. SHIPLEY

It is certified that error appears in the above-identified patent and that said Letters Patent are hereby corrected as shown below:

Column 2, line 1, after "shown", insert -- a -- .

Column 4, line 4, "being" should read -- bring -- ; line 21, after "with", insert -- the -- ; line 45, "is", should read -- in -- ; line 47, "two", 1st occurrence, should read -- to --.

Signed and sealed this 22nd day of January 1974.

(SEAL)
Attest:

EDWARD M. FLETCHER, JR.
Attesting Officer

RENE D. TEGTMEYER
Acting Commissioner of Patents